United States Patent [19]

Tanaka

[11] 4,371,128

[45] Feb. 1, 1983

[54] SEAT BELT RETRACTOR ASSEMBLY WITH PAWL MOUNTED PENDULUM

[75] Inventor: Akira Tanaka, Northridge, Calif.

[73] Assignee: American Safety Equipment Corp., New York, N.Y.

[21] Appl. No.: 193,958

[22] Filed: Oct. 6, 1980

[51] Int. Cl.³ .................... A62B 35/02; B65H 75/48
[52] U.S. Cl. ............................................ 242/107.4 A
[58] Field of Search ............... 242/107.4 R–107.4 E; 280/806; 297/478, 480

[56] References Cited

U.S. PATENT DOCUMENTS

| | | | |
|---|---|---|---|
| 3,834,646 | 9/1974 | Heath | 242/107.4 A X |
| 3,923,269 | 12/1975 | Kell | 242/107.4 A |
| 3,946,965 | 3/1976 | Singh | 242/107.4 A |
| 4,046,332 | 9/1977 | Wheeler et al. | 242/107.4 A |
| 4,162,773 | 7/1979 | Wallin | 242/107.4 A |

*Primary Examiner*—John M. Jillions

*Attorney, Agent, or Firm*—Poms, Smith, Lande & Rose

[57] ABSTRACT

An emergency spool release for use with a seat belt retractor mechanism is shown wherein the seat belt mechanism includes a spool for storing a belt which restrains the passenger of a vehicle during an emergency. The belt is urged into a retracted position by spring means while the protracted position of the belt is restrained in an emergency by the automatic engagement of a locking pawl against ratchet teeth found on the periphery of the spool. The automatic engagement is accomplished by a unique inertia locking system which uses two sets of pawls and two ratchets. The first locking pawl mounts a second pawl which is placed in motion by an inertia mass also mounted upon the first pawl. The second pawl engages a second set of ratchet teeth which pull the second pawl and thus the first pawl into engagement with the first set of ratchet teeth to lock the spool.

15 Claims, 13 Drawing Figures

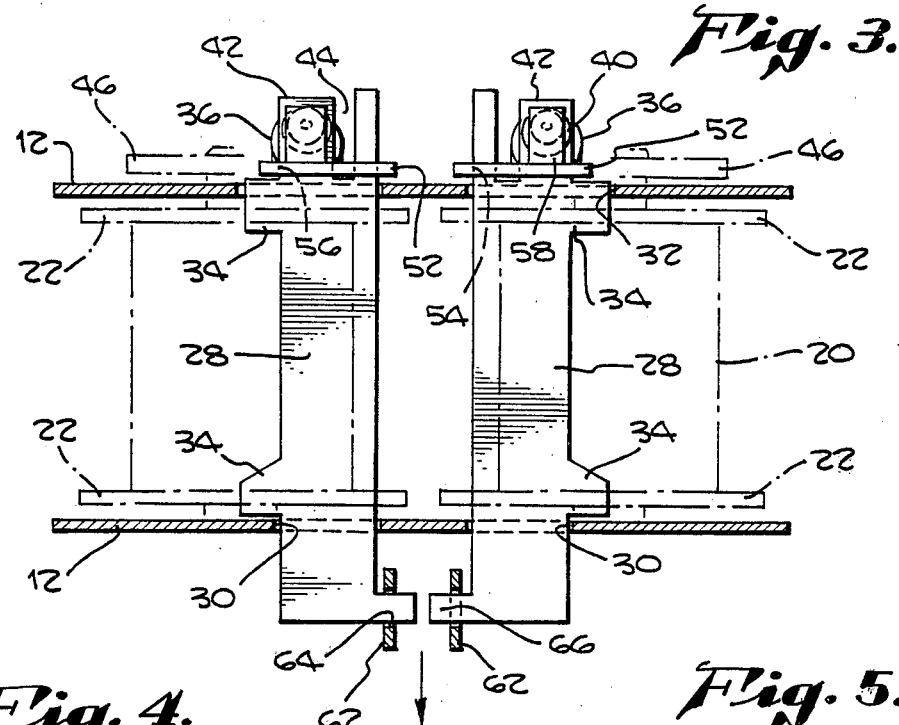
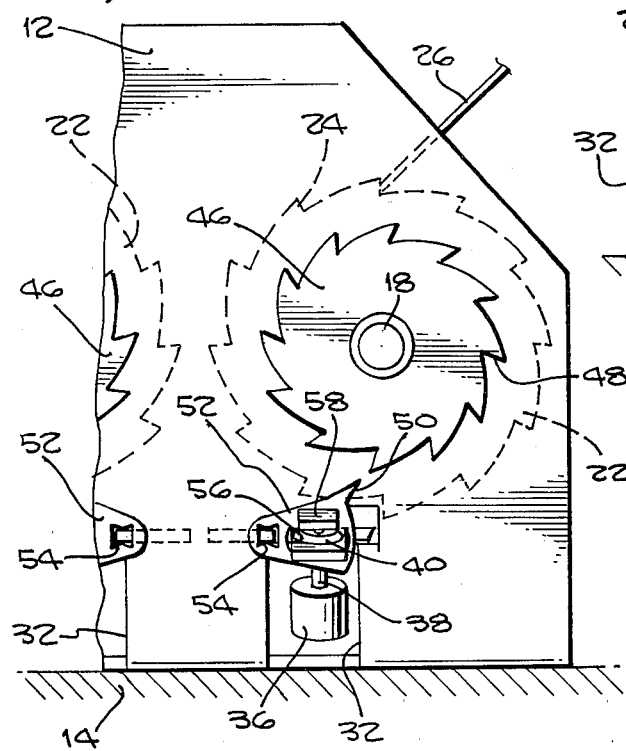

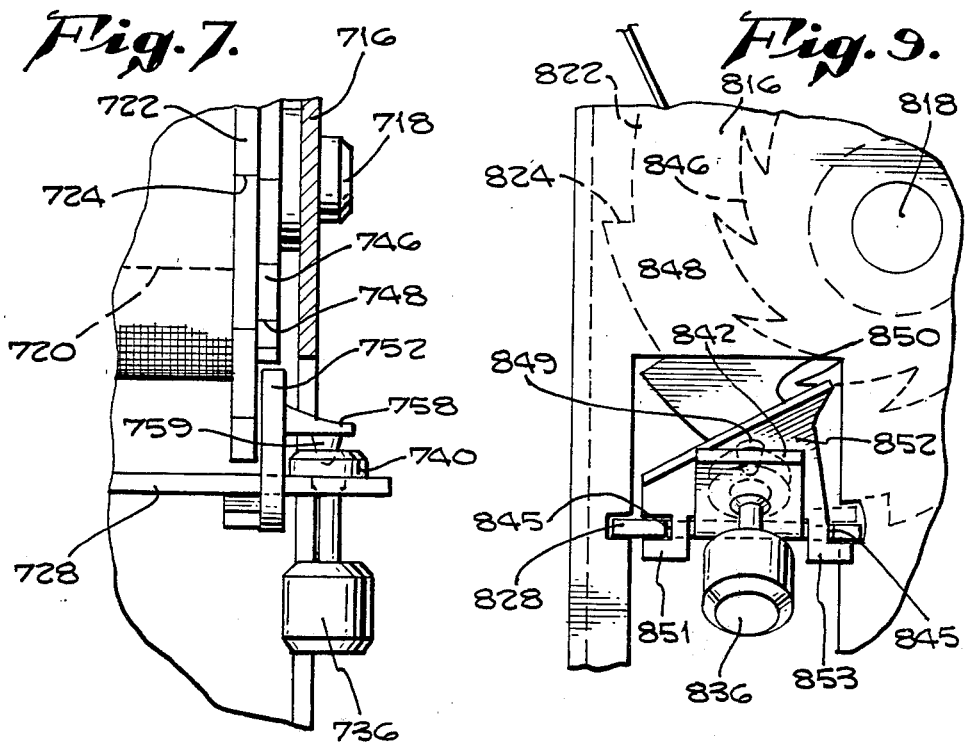
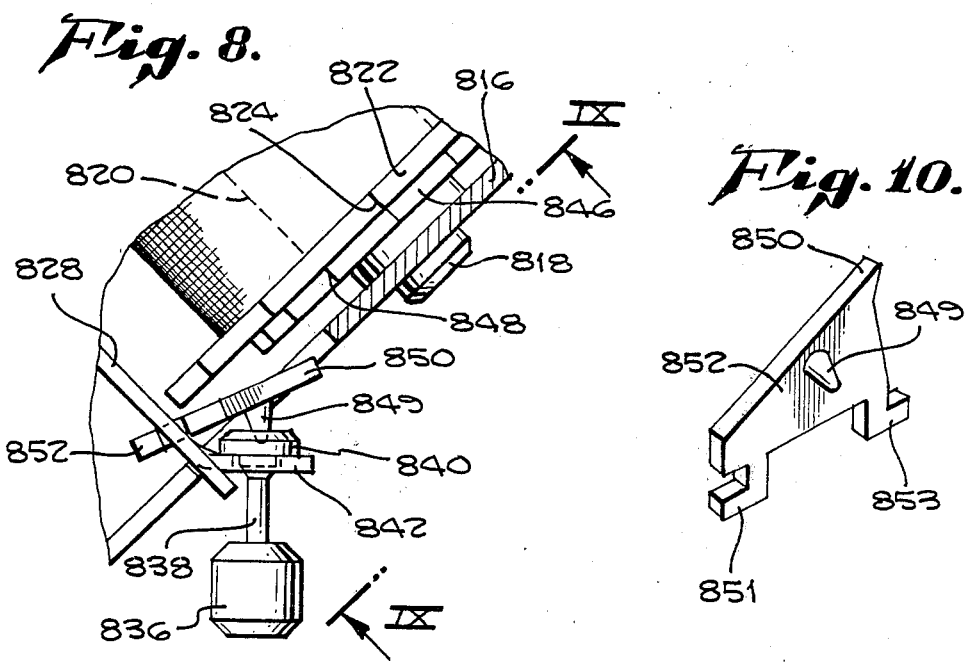

SEAT BELT RETRACTOR ASSEMBLY WITH PAWL MOUNTED PENDULUM

BACKGROUND OF THE INVENTION

The present invention relates to emergency seat belt mechanisms and, more particularly, to an emergency seat belt mechanism having automatic inertia locking during an emergency condition wherein an inertia mass which accomplishes the locking mounts upon the locking pawl.

Emergency locking safety belt retractors used in vehicles for storing a safety belt thereon and for allowing unreeling of the safety belt from the retractor to permit the belt to be placed about, and thus restrain, a passenger during an emergency are known. These retractors allow the uncoiling of a safety belt at all times except during a crash or other emergency situation when the belt locks to prevent its further protraction. The locking is accomplished by an inertia-sensitive safety retractor lock which includes an inertia mass that responds to a crash or sudden deceleration of the vehicle in which it is mounted. This deceleration causes the inertia mass to actuate a locking pawl which engages ratchet teeth upon a spool that stores the safety belt.

As safety belts have been utilized for several years within vehicles of all types, the simple belt and adjustable buckle first utilized years ago has been replaced by evermore complex and intricate mechanisms. For example, the inertia mass which automatically locks the safety belt and prevents further protraction was developed after spring-loaded retraction of a safety belt was introduced. Spring retraction of a safety belt was, in turn, introduced because users became annoyed with a loose belt laying about a vehicle. Annoyance with a device leads to removal of the device. Removal of such a safety device clearly is not the desire of manufacturers of vehicles within which the device is mounted nor of government agencies that require the device. Accordingly, spring retraction was developed.

Spring retracted devices require locking at some protracted position to prevent further protraction during an emergency deceleration. First designs allowed the user of a safety belt to extend the belt to a given position wherein it was locked from further protraction. Once the user of this so-called automatic locking retractor placed the belt about his or her body, the belt had a tendency to continually retract while the latch within the seat belt mechanism prevented further protraction. The "cinching" effect became uncomfortable and contributed to a lack of use of the seat belt.

The cinching effect was eliminated through the utilization of a so called vehical sensitive retractor in which a continuously protractable seat belt which is prevented from further protraction by inertia locking during an emergency deceleration of the vehicle. During an emergency stop, an inertia mass has been used to cause the displacement of a locking pawl into a locking position against the ratchet teeth on a seat belt spool. See, for example, U.S. Letters Patent No. 2,708,966 which issued May 24, 1955 entitled Inertia-Operated Safety Equipment by R. L. Davis.

Experience has taught that it is possible for the locking pawl to engage the tip of a ratchet tooth and thus bounce back from a locking position. Several inertia devices have been proposed to eliminate this bouncing problem. See, for example, U.S. Letters Patent No. 3,889,898 which issued June 17, 1975 by A. Ziv entitled Piggyback Dual Lock Bar, assigned to the assignee of a present invention. See also U.S. Letters Patent No. 3,937,416 which issued Feb. 10, 1976, each of which are assigned to the assignee of the present invention.

These prior art seat belt systems have generally required the user to manually adjust the seat belt by protraction or other adjustment before operating the vehicle in which the user was riding. Such systems, referred to as active systems, have created some annoyance which, as in earlier prior art systems, resulted in lack of use. To overcome this problem, passive seat belt systems have been developed which require no adjustment by the user. An example of a passive seat belt system is shown in U.S. Pat. No. 4,245,856, entitled Emergency Release for Passive Seat Belt Systems by Z. Ziv which is assigned to the same assignee as the present invention.

In either a passive or active seat belt system it has been found that automatic inertia locking to prevent further protraction of the belt during an emergency can create problems if the inertia mass is not always mounted in a vertical position. Another problem is noise within the vehicle due to the high frequency vibration of the locking pawl. Further, most prior art systems designed to eliminate the bounce problem require multiple parts.

SUMMARY OF THE INVENTION

Accordingly, it is an object of the present invention to provide an inertia locking system which prevents the undesired vibrations of a locking pawl.

It is still another object of the present invention to provide an inertia locking system in which the inertia mass is always properly oriented with respect to its housing and the vehicle. Still another object is to provide an inertia locking system which prevents a locking pawl from hitting the tip of a ratchet tooth on a spool and bounching back from a desired locking position.

In accomplishing these and other objects, the present invention utilizes a locking pawl which may be manually released in a post emergency condition, the unique features of which are claimed in a co-pending patent application Ser. No. 193,957, filed Oct. 6, 1980, by A. Tanaka, A Ziv, W. Hollowell and N. Stamboulian, assigned to the same assignee as the present invention. The locking pawl is generally urged into a locked position by the motion of an inertia mass. In most prior art seat belt retractor assemblies, the inertia mass is mounted upon the housing of the assembly. The present invention mounts the mass upon the locking pawl.

As the vehicle in which the seat belt retractor assembly is mounted is decelerated, due to a crash or sudden stop, the inertia mass is rotated by that sudden stop for lifting a second pawl into engagement with a second set of ratchet teeth mounted upon the surface of a spool holding the seat belt. The second pawl and ratchet are provided with sharp teeth which, once engaged, draw the second pawl into further engagement with the second ratchet teeth. The second pawl, mounted upon the first locking pawl, in turn, pulls the first locking pawl into engagement with a first set of teeth on the outer edges of the spool which mounts the safety belt. By mounting the inertia mass upon the first locking pawl, the weight of the inertia mass retains the locking pawl against vibration thus reducing noise within the vehicle. By mounting the inertia mass upon the locking pawl, it is also possible to use an insert in the pawl which permits the inertia mass to remain vertical at any mounting angle.

Through the arrangement of the present invention, it is possible to use mold parts to initiate the mechanical motion of the automatic locking system while utilizing stamped metal parts to provide the mechanical force necessary to adequately lock the system in an emergency condition. Molded parts permit a sharper tooth on the locking pawl and ratchet teeth, thus eliminating the problem of bounce back during an emergency stop.

DESCRIPTION OF THE DRAWINGS

Other objects and advantages of the present invention will become apparent to those skilled in the art after review of the accompanying drawings wherein:

FIG. 3 is a plane sectional view taken along line III—III of FIG. 1;

FIG. 4 is an segmented end view, similar to FIG. 1, showing the opposite end of the seat belt retractor mechanism;

FIG. 5 is a segmented end view of the seat belt retractor mechanism shown in FIG. 4 showing a locking pawl rotated about its longitudinal axis from its normal position;

FIG. 6 is a perspective view showing a second locking pawl used in the present invention;

FIG. 7 is a segmented side cross-sectional view, similar to FIG. 2, showing a second embodiment of the present invention;

FIG. 8 is a segmented side cross-sectional view similar to FIG. 7, showing another embodiment of the present invention;

FIG. 9 is a segmented end view, similar to FIG. 1, taken along line IX—IX of FIG. 8;

FIG. 10 is a perspective view showing a second locking pawl used in the embodiment of FIGS. 8 and 9;

DESCRIPTION OF THE PREFERRED EMBODIMENT

Figure 2:
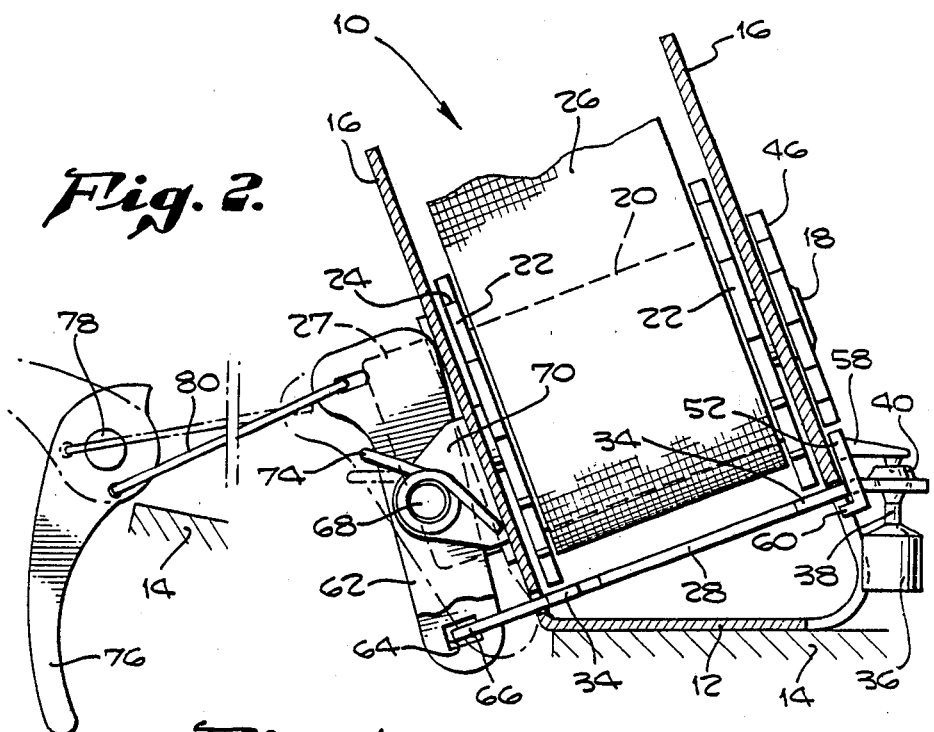
FIG. 2 is a side cross-sectional view taken along line II—II of FIG. 1.
Figure 1:
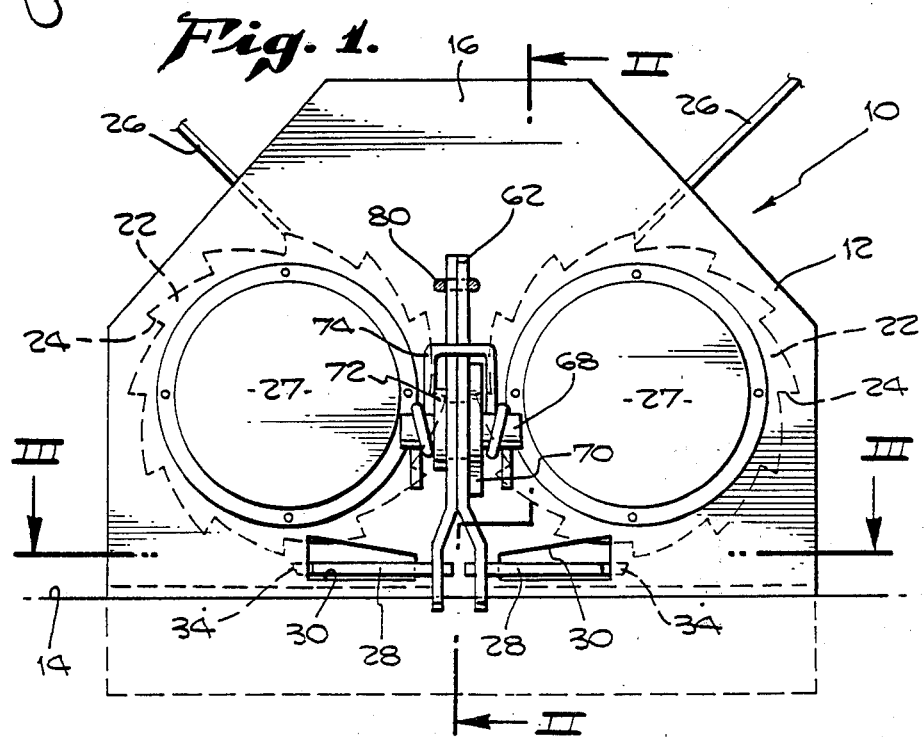
FIG. 1 is an end view showing a seat belt retractor mechanism incorporating the present invention.

Referring now to the drawings, FIG. 1 shows a seat belt retractor mechanism 10 including a housing 12 formed from a stamped metal sheet mounted upon a vehicle frame 14, FIG. 2. It will be seen in FIG. 2 that the housing 12 is formed with its base parallel to the frame of the vehicle and its oppositely extending arms 16 bent at an angle to the frame 14. Mounted between the arms 16 is a spool shaft 18 which rotatably mounts a spool 20 formed with spool ends 22 having ratchet-like teeth 24 on the periphery of each spool end.

Mounted upon the spool 20 between ends 22 is a seat belt 26 which may be protracted from the spool 20 by the user in an active seat belt system or by the opening of the vehicle door in a passive seat belt system. It will be noted that the base of the housing 12 is arranged at an angle to the arms 16 to permit the shaft 18 and spool 20 to be arranged at a suitable angle. This permits the seat belt 26 to be protracted from its spool 20 and about the user at a comfortable angle. Further, the seat belt retractor mechanism 10 is shown with two seat belt retractor spools since most vehicles, such as the automobile, have side-by-side seating arrangements. Clearly, the seat belt retractor mechanism of the present invention may be utilized with but a single spool 20 and belt 26.

Under the urging of a spring, not shown, mounted within a spring housing 27, the spool 20 continuously retracts the belt 26. A spring housing device which reduces the torsional force exerted by the spring to improve the comfort of the user is shown in U.S. Letters Patent No. 4,026,494 which issued May 31, 1977 entitled Safety Belt Tension Reducing Means by A. Tanaka, assigned to the assigned to the assignee of the present invention. The specification of that application as it relates to the adjustment of retraction torque is incorporated herein by reference.

As the seat belt retractor mechanism of the present invention is in a continuous state of adjustment due to the lack of a manual locking mechanism, it is desirable to use an automatic inertia locking system formed by a locking pawl 28 mounted between the housing arms 16 within suitable apertures 30, FIG. 1, and 32, FIG. 5. The locking pawl is formed from a planar sheet of metal with its longitudinal axis substantially longer than the axis along its width. The pawl 28 passes through apertures 30 and 32 and is retained therein by extending tabs 34 which are wider than the opening 30 and may be urged against that opening by spring loaded lever means to be described hereinbelow. The tabs 34 extend laterally from the longitudinal axis of the locking pawl 28 and rest in their normal position on the horizontal, lower edges of apertures 30 and 32. This position is retained, to some extent, by an inertia mass 36 which is mounted upon one end of the locking pawl 28.

The inertia mass 36, seen in FIG. 2, comprises the mass 36 attached by a stem 38 to an actuator 40. The stem passes through an aperture within a tab 42, FIG. 3, which is separated from the locking pawl 28 by a longitudinal slit 44 and bent at an angle thereto so that the mass 36 hangs vertically toward the frame 14.

As described in U.S. Letters Patent No. 3,889,898 referred to hereinabove, a sudden deceleration of the vehicle in which the seat belt retractor mechanism 10 is mounted will cause the mass 36 to rotate to the left, FIG. 2, causing the actuator 40 to rotate about its edge. In the prior art, the actuator 40 may directly engage the locking pawl 28, as shown in the 3,899,898 patent, for raising the locking pawl by rotating it around its longitudinal axis, as shown in FIG. 5. The rotational motion of the locking pawl 28 causes tabs 34 to engage the ratchet teeth 24 for locking the spool 20 and preventing further protraction of the seat belt 26.

The present invention utilizes a second pawl and ratchet combination. In this invention, a second ratchet 46 is formed from a plastic piece mounted upon shaft 18 on the external side of the housing arm 16, as shown in FIGS. 2 and 4. Each ratchet tooth 48 formed on the second ratchet 46 has a sharper tooth angle which engages a similar tooth 50 on a second pawl 52, FIG. 6. The second pawl 52, which in this embodiment may be a molded plastic piece, is formed with two apertures 54 and 56 for clearing the end of the locking pawl 28. The narrow sections of the second pawl 52 pass through the slots 44 in the end of the locking pawl 28 wherein the angular bend applied to the end of the locking pawl secures the second locking pawl 52 into position.

Extending at an acute angle from the center of the second locking pawl 52 is an actuator engaging tab 58 which contacts the top of actuator 40 attached to the mass 36, FIG. 2. A similar tab 60 extends at a right angle from the lower end of locking pawl 52 to engage the surface of locking pawl 28 as the second pawl is raised by the action of ratchet teeth 48 on the second ratchet 46. The second ratchet 46 and locking pawl 52 form a programmed pawl retractor with ratchet 22 and pawl 28.

That is, the second ratchet and locking pawl solves a pawl bounce problem similar to the problem solved by the dual lock bar shown in the 3,899,898 patent. As the vehicle, in which the seat belt retractor mechanism 10 is mounted, is decelerated in an emergency stop, such as a crash, the mass 36 moves to the left, FIG. 2, to rotate the actuator 40 and raise the locking pawl 52 through contact with the tab 58. As the locking pawl 52 is raised, tooth 50 engages a ratchet tooth 48 and is drawn upward, pulling the first locking pawl 28 with it into engagement with a ratchet tooth 24. The relative position of ratchet teeth 48 with ratchet teeth 22 assures the continued movement of the pawl 28 into engagement with teeth 22 without bouncing back from such engagement. This movement locks the seat belt retractor mechanism 10 to prevent the further protraction of the belt 26. The sharpness of the plastic ratchet teeth 48 is such that they will not cause a bounce back when engaged by the pawl tooth 50. The teeth of the two molded plastic parts, 46 and 50, may be made much sharper than the corresponding teeth of the metal part, 24 and 28, which must carry the mechanical stress created by impact.

Once the inertia mass 36 has caused the locking pawl 28 to engage the ratchet tooth 24, normal vehicle operation permits the mass 36 to return to its vertical position thus permitting the locking pawl 28 to fall from the locked position as soon as tension is relieved on the seat belt 26.

However, should the vehicle over turn, the mass 36 may not return to its vertical position thus raising the possibility of locking the seat belt retractor mechanism 10 to prevent further protraction of the seat belt 26. Further, the user may be placing tension upon the seat belt 26 in a post emergency condition to retain the locking pawl 28 against the ratchet tooth 24. In order to eliminate the locked condition thus created, the locking pawl 28 may be moved along its longitudinal axis for changing the alignment of teeth 34 shown in FIG. 3 and described in greater detail in the co-pending patent application by A. Tanaka, A. Ziv, W. Hollowell and H. Stambouliam. In the realigned condition the tabs 34 no longer engage the ratchet teeth 24 thus permitting the spool 20 which stores seat belt 26 to turn freely.

There are several arrangements which may be used to manually move the locking pawl 28 transversely along its longitudinal axis. The embodiment shown in FIGS. 1 and 2 includes a lever 62 formed from two stamped sheet metal parts whose lower sections have been displaced, FIG. 1, and provided with apertures 64, FIG. 2, which fit about tabs 66 that extend inwardly from the locking pawl 28, FIG. 3. The lever 62 is attached to the housing 12 by a shaft 68 which passes through a tab 70 that may be formed by stamping and bending metal from the surface of the housing arm 16. The shaft 68 is retained within tab 70 by staking; while an extended shoulder 72 retains the levers 62 in the position shown. A spring 74 urges the levers 62 into a first position shown by the arrow in FIG. 3 wherein the engagement of aperture 64 about locking pawl tab 66 forces the tab 34 against housing 12 to retain the locking pawl 28 therein. A two-position release handle 76 is attached to a shaft 78 mounted upon the vehicle frame 14 as shown in FIG. 2. Connecting the handle 76 to the lever 62 is a connecting rod 80 which may also be formed from a flexible cable. It will be understood that the handle 76 may be raised against the urging of the spring 74 until the rod 80 passes beyond the center of shaft 78. At this time, the spring 74 tends to lock the handle 76 into the second position shown in phantom in FIG. 2.

A second embodiment of the present invention is shown at FIG. 7 which is similar to FIG. 2 with the exception that the arms 716 of the retractor assembly are arranged at right angles to the frame, not shown. As shaft 718 is mounted within an aperture in arm 716 to support a spool 720 having disk shaped spool ends 722 with ratchet teeth 724 on the outer periphery thereof. Mounted between the arms 716 is a locking pawl 728 upon which an inertia mass 736 is mounted by an actuator 740. A second pawl 752 also mounts upon the end of the locking pawl 728 in a similar manner to the mounting of the second pawl 52 upon the locking pawl 28. In this embodiment, the tab 758 extends at a right angle from the second pawl 752 and engages, via a detent 759, the upper actuator portion 740 of the inertia mass 736 hanging vertically from the pawl 728. As the inertia mass rotates, it lifts the second pawl 752 which engages ratchet teeth 748 upon a second ratchet 746.

From a quick review of FIG. 2 and FIG. 7 it will become apparent that the major difference between the two embodiments is the angle of the arms 716. In order to compensate for this angle, the locking pawl 728 is arranged to mount the inertia mass 736 upon a surface parallel to the mounting surface of the frame. Similarly, the tab 758 is arranged at a right angle or substantially parallel to the mounting surface. This assures a maximum amount of displacement of pawl 752 caused by the rotational motion of the mass 736 which displaces the actuator 740.

A third embodiment of the present invention is shown in FIGS. 8 and 9 wherein arms 816 which support a shaft 818 about which is rotatably mounted a spool 820 having ratchet teeth 824 upon spool ends 822. Mounted between the arms 816 is a locking pawl 828 whose lower most end is bent at an angle to form a tab 842 which is parallel to the frame of the vehicle, not shown, and perpendicular to the vertical axis of the vehicle under normal operating conditions. Mounted upon the tab 842 is an inertia mass 836 which is connected by a stem 838 to an actuator 840.

A second pawl 852, FIG. 10, is mounted within notched slots 845, as shown in FIG. 9. The notched slots placed in pawl 828 retain the second pawl 852 in the position shown upon the locking pawl 828. The second pawl 852 is formed with a generally flat cross section having a detent 849 extending at an acute angle away from the flat surface thereof. The opposite end of the pawl 852 is provided with two extending L-shaped tabs 851 and 853 which retain the pawl 852 within slots 845. On the upper most end of the pawl 852 is a tooth 850 which engages a second ratchet 846 having ratchet teeth 848 mounted on shaft 818 and spool end 822.

The difference between the embodiments shown in FIGS. 8 and 9 and those previously discussed is the axis about which the second pawl 852 rotates. In the previous embodiments, that axes were perpendicular to the plane of the pawl. In the embodiment shown in FIGS. 8 and 9, the rotational axis of the second pawl 852 passes through and along one edge of the plane in which the flat surface of the pawl lies. Thus, when the inertia mass 836 is rotated by a sudden deceleration of a vehicle in which it is mounted, the motion of the mass causes the second pawl 852 to rotate about its edge and into a position wherein the tooth 850 engages one of the ratchet teeth 848.

Figure 11:
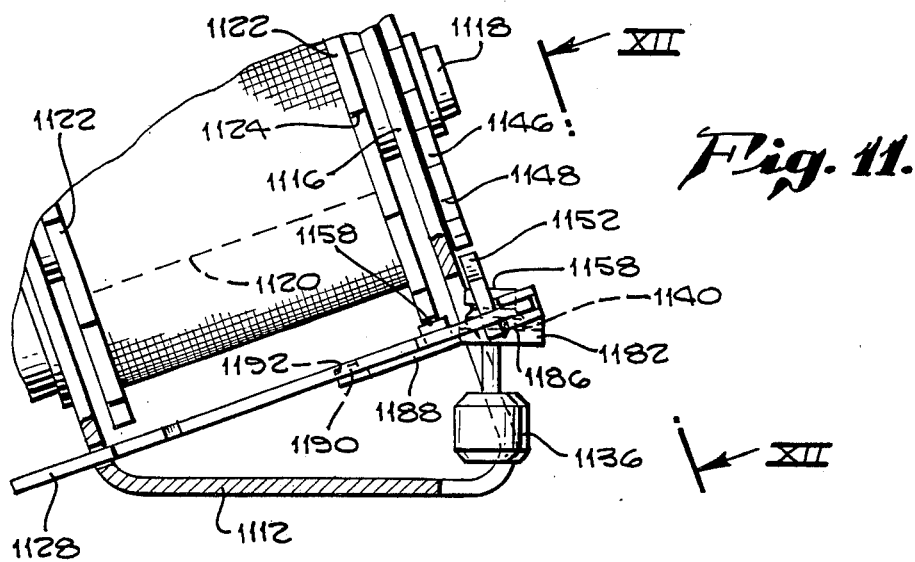
FIG. 11 is a segmented side cross-sectional view, similar to FIG. 8, showing another embodiment of the present invention.
Figure 13:
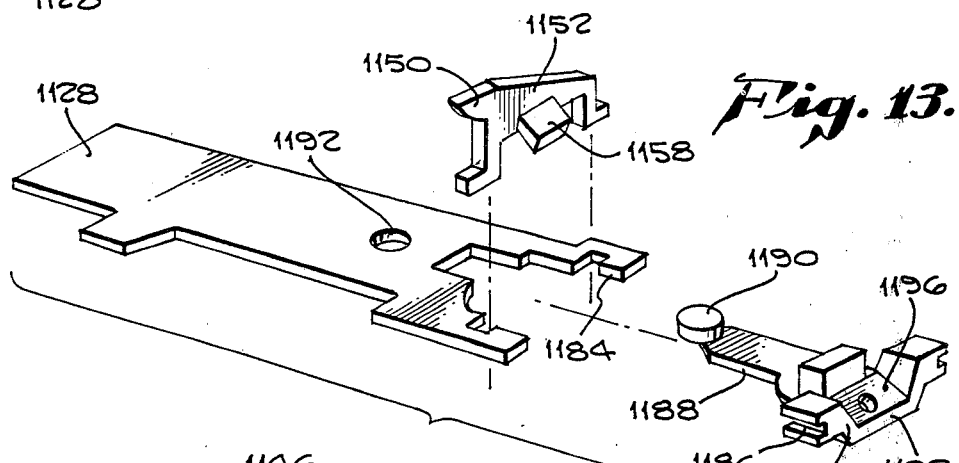
FIG. 13 is a perspective view showing an insert which enables the inertia mass to be vertically mounted with respect to the seat belt retractor assembly housing regardless of the orientation of that housing.
Figure 12:
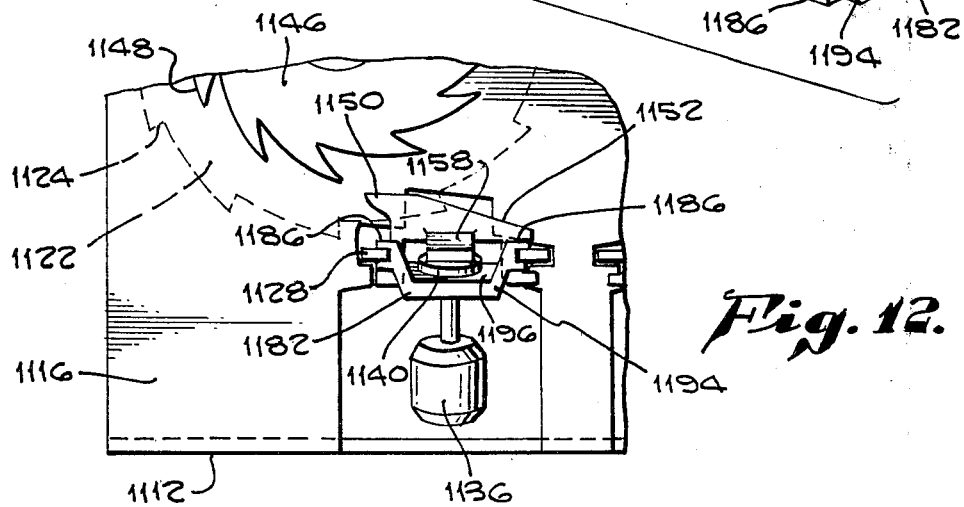
FIG. 12 is a segmented end view taken along line XII—XII of FIG. 11.

Referring now to FIGS. 11–13, a last embodiment of a preferred invention will be shown. It will be noted from FIGS. 2, 7 and 8 that the inertia mass 36 should hang in a vertical direction toward the frame of the vehicle. In order to accomplish this, it is necessary to bend a tab 42 on a locking pawl 28 at various angles. The embodiments of FIGS. 8 and 9 demonstrate one configuration which may be used when the angle between the vehicle and the locking pawl 828 is substantial. However, to eliminate the need for various pieces having various angles, a molded plastic piece may be used along with the molded second ratchet and second locking pawl.

As seen in FIG. 11, the frame 1116 supports a shaft 1118 upon which is mounted the spool 1120 having ends 1122 with ratchet teeth 1124 on the outer periphery of each end. A locking pawl 1128 mounts between the arms 1116 as in the prior embodiment. However, the locking pawl is provided with a molded piece 1182 which is mounted within an irregular slot 1184 on the end of the locking pawl adjacent a second ratchet 1146. The slot 1184 is generally rectangular with edges that receive C-shaped end tabs 1186, FIG. 13, on each side of the molded piece 1182 wherein the C-shaped tabs grip the thickness of the locking pawl 1128. An extending arm 1188 is provided with a shouldered detent 1190 that engages an aperture 1192 located in the locking pawl 1128 for latching the molded piece 1182 thereto. Webs 1194 connect the C-shaped tabs 1186 to a central platform 1196 of the molded piece 1182 where an inertia mass 1136 is mounted.

It will be seen that the molded insert 1182 may be arranged with any angle between its C-shaped tabs 1186 and its mounting platform 1196. Similarly, a second pawl 1152 is arranged with a tab 1158 extending at an angle therefrom. It will now be seen that the angle of the platform 1196 and the tab 1158 may be adjusted by simply changing the molded parts which are used. In this manner, the seat belt retractor mechanism 10 may be designed for mounting in one of several orientations. All that one need do to accomodate the several orientations is simply replace the molded plastic pieces 1152 and 1182.

As best seen in FIG. 11, a sudden stop of the vehicle in which the seat belt retractor mechanism is mounted will cause the inertia mass 1136 to rotate thus rotating the actuator 1140 and lifting the second pawl 1152. As the second pawl lifts, the tooth 1150 engages one of the ratchet teeth 1148 upon ratchet 1146. As pressure is applied to the safety belt, the sharp angle of the second ratchet teeth draws the second pawl 1152 in an upward direction and pulls the first metal latching pawl 1128 into a latching configuration with the ratchet teeth 1124 upon the spool ends 1122.

Due to the molded plastic parts which form the second pawl 1152 and the second ratchet 1146, for example, it is possible to shape the ratchet teeth 1148 or the pawl tooth 1150 at a sharp angle thus permitting easy engagement without the probability of a bounce back condition should the tip of one of the teeth contact the tip of another. These sharp teeth may be used in the embodiments shown as the design does not require the second engaging pawl or second ratchet teeth to carry the force exerted upon the seat belt retractor mechanism by the pressure of a user in a sudden deceleration. The molded pieces simply act as the mechanism device for moving the metal latching pawl 1128 into engagement with the ratchet teeth 1124.

By using the molded insert 1182, it is possible to utilize the same seat belt retractor mechanism in several orientations by simply changing the molded parts 1152 and 1182. Further, the molded insert 1182 provides a softer surface upon which the inertia mass 1136 may rest, thus further reducing any high frequency vibration noise caused by the loosely hanging inertia mass 1136.

While several embodiments of the present invention have been described, it will be apparent to those skilled in the art that other configurations are possible. Accordingly, the present invention should be limited only by the appended claims.

I claim:

1. In an emergency locking seat belt retractor mechanism including a belt winding spool, at least one spool associated ratchet member having a plurality of ratchet teeth, locking pawl means mounted for engaging the ratchet teeth of said ratchet member on actuation thereof, and an improved emergency responsive means for automatically actuating said locking pawl means to lock said spool via said ratchet member comprising:

an inertia responsive mass mounted upon said locking pawl means;
said locking pawl means having one end thereof provided with one or more slots for forming an end tab;
said end tab having an aperture therein for mounting said inertia mass, and said end tab offset from said locking pawl means within said belt retractor mechanism parallel to the horizontal for mounting said inertia mass vertically thereto;
a second pawl slidably mounted upon said locking pawl means for automatic actuation by said inertia responsive mass in response to an emergency;
said second pawl configured to slide into said one or more slots within said locking pawl means for slidably mounting thereon;
a second ratchet member having a plurality of ratchet teeth mounted upon said spool which engages said second pawl when said second pawl is actuated by said inertia responsive mass; and
means on said second pawl to engage said first mentioned locking pawl means and draw said first locking pawl means into engagement with said first mentioned ratchet teeth thereby locking said spool.

2. In an emergency locking seat belt retractor mechanism, as claimed in claim 1, the improvement in emergency responsive means additionally comprising:

said second pawl having at least one tooth for engaging said ratchet teeth on said second ratchet member;
said second pawl and second ratchet member molded with sharp teeth angles to prevent said at least one pawl tooth from bouncing back upon engagement with said ratchet teeth of said second ratchet member; and said locking pawl and ratchet member stamped with limited teeth angles to provide the strength necessary to engage and lock said spool.

3. In an emergency locking seat belt retractor mechanism, as claimed in claim 1, the improvement in emergency responsive means additionally comprising:
said second pawl slidably mounted upon said first mentioned locking pawl means and retained thereon by said offset of said end tab.

4. In an emergency locking seat belt retractor mechanism, as claimed in claim 3, the improvement in emergency responsive means additionally comprising:
said second pawl slidably mounted upon said locking pawl means pivots about an axis perpendicular to the plane thereof.

5. In an emergency locking seat belt retractor mechanism, as claimed in claim 3, the improvement in emergency responsive means additionally comprising:
said second pawl slidably mounted upon said locking pawl means pivots about an axis parallel to and contained by the plane thereof.

6. In an emergency locking seat belt retractor mechanism, as claimed in claim 1, the improvement in emergency responsive means additionally comprising:
said locking pawl having a longitudinal axis with said end tab offset formed by bending said end tab at an angle to said longitudinal axis of said pawl whereby said tab is parallel to said horizontal.

7. In an emergency locking seat belt retractor mechanism including a belt winding spool, at least one spool associated ratchet member having a plurality of ratchet teeth, locking pawl means mounted for engaging the ratchet teeth of said ratchet member on actuation thereof, and an improved emergency responsive means for automatically actuating said locking pawl means to lock said spool via said ratchet member comprising:
an inertia responsive mass mounted upon said locking pawl means;
said locking pawl means having one end relieved to form an opening;
an inertia mass platform mounted in said opening having a platform parallel to the horizontal upon which said inertia mass is mounted vertical to said horizontal;
a second pawl slidably mounted upon said locking pawl means for automatic actuation by said inertia responsive mass in response to an emergency;
said inertia mass platform slidably retaining said second pawl upon said locking pawl;
a second ratchet member having a plurality of ratchet teeth mounted upon said spool which engages said second pawl when said second pawl is actuated by said inertia responsive mass; and
means on said second pawl to engage said first mentioned locking pawl means and draw said first locking pawl means into engagement with said first mentioned ratchet teeth thereby locking said spool.

8. In a seat belt retractor mechanism including a frame, a belt winding spool having a ratchet member mounted thereon and a locking pawl for engaging said ratchet member in an emergency condition, the improvement comprising:
a separate inertia mass platform connected to and mounted upon said locking pawl;
an inertia mass mounted upon said platform;
a second pawl loosely mounted upon said locking pawl in contact with said mass;
said second pawl retained in its mounted position upon said locking pawl by said platform; and
a second ratchet mounted on said spool wherein an emergency condition displaces said mass which displaces said second pawl into engagement with said second ratchet which, in turn, draws said second pawl into further engagement for drawing said first mentioned locking pawl into engagement said first mentioned ratchet member to lock said spool.

9. In a seat belt retractor mechanism, as claimed in claim 8, the improvement further comprising:
said belt winding spool having an axis of rotation;
said locking pawl having a longitudinal axis parallel to said axis of rotation;
said locking pawl having a first longitudinal end formed to receive and mount said inertia mass platform and said second pawl;
said locking pawl having a second longitudinal end;
spring means connected to said second longitudinal end of said locking pawl for urging said pawl in an axial direction.

10. In a seat belt retractor mechanism, as claimed in claim 8, the improvement further comprising:
said inertia mass platform having a platform offset at an angle parallel to the horizontal for mounting said inertia mass in a vertical position independent of the orientation of said axis of rotation of said spool and the longitudinal axis of said locking pawl.

11. A seat belt retractor mechanism including a frame, a belt winding spool having a ratchet member mounted thereon and a locking pawl for engaging said ratchet member in an emergency condition, the improvement comprising:
said locking pawl having one end relieved to form an opening;
an inertia mass platform mounted in said opening having a platform parallel to the horizontal;
an inertia mass mounted upon said horizontal platform;
a second pawl mounted upon said locking pawl in contact with said inertia mass; and
a second ratchet mounted on said spool wherein an emergency condition displaces said mass to displace said second pawl into engagement with said second ratchet which, in turn, draws said second ratchet into further engagement for drawing said locking pawl into engagement with said first mentioned ratchet for locking said spool.

12. A seat belt retractor, as claim in claim 11, additionally comprising:
said second pawl having at least one tooth for engaging said second ratchet member;
said second pawl and second ratchet member molded with sharp teeth angles to prevent said at least one pawl tooth from bouncing back upon engagement with said second ratchet member; and
said locking pawl and first mentioned ratchet member stamped with limited teeth angles to provide the strength necessary to engage and lock said spool.

13. A seat belt retractor, as claimed in claim 11, additionally comprising:
spring means connected between a second end of said locking pawl and said frame for urging said locking pawl in an axial direction.

14. A seat belt retractor, as claimed in claim 11, additionally comprising:

said inertia mass platform having at least three points for engaging said relieved end of said locking pawl and for latching said platform thereto.

15. A seat belt retractor, as claimed in claim 11, additionally comprising:

said second pawl loosely mounted upon said locking pawl; and said second pawl retained in said loosely mounted position by said inertia mass platform.

* * * * *